(12) United States Patent
Longenecker

(10) Patent No.: US 11,841,151 B2
(45) Date of Patent: Dec. 12, 2023

(54) METHOD OF OPERATING AN ELECTRONIC EXPANSION VALVE IN AN AIR CONDITIONER UNIT

(71) Applicant: Haier US Appliance Solutions, Inc., Wilmington, DE (US)

(72) Inventor: Joshua Duane Longenecker, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 43 days.

(21) Appl. No.: 17/539,315

(22) Filed: Dec. 1, 2021

(65) Prior Publication Data

US 2023/0167993 A1    Jun. 1, 2023

(51) Int. Cl.
| | |
|---|---|
| *F24F 11/30* | (2018.01) |
| *F25B 49/02* | (2006.01) |
| *F25B 41/34* | (2021.01) |
| *F24F 110/10* | (2018.01) |

(52) U.S. Cl.
CPC ............ *F24F 11/30* (2018.01); *F25B 41/34* (2021.01); *F25B 49/02* (2013.01); *F24F 2110/10* (2018.01); *F25B 2600/01* (2013.01); *F25B 2600/2513* (2013.01); *F25B 2700/171* (2013.01)

(58) Field of Classification Search
CPC ....... F24F 11/30; F24F 2110/10; F25B 41/34; F25B 49/02; F25B 2600/2513
See application file for complete search history.

(56) References Cited

U.S. PATENT DOCUMENTS

| | | |
|---|---|---|
| 5,533,347 A | 7/1996 | Ott |
| 7,076,962 B2 | 7/2006 | He |
| 7,784,296 B2 | 8/2010 | Chen |
| 8,151,583 B2 | 4/2012 | Douglas |
| 10,174,977 B2 | 1/2019 | Lin |
| 10,254,026 B2 | 4/2019 | Patel |
| 10,486,499 B2 | 11/2019 | Stanke |
| 10,612,826 B2 | 4/2020 | Hern |
| 10,704,814 B2 | 7/2020 | De |
| 10,823,448 B2 | 11/2020 | Jiang |
| 10,828,965 B2 | 11/2020 | Xu |
| 2005/0126190 A1 | 6/2005 | Lifson |
| 2013/0174591 A1 | 7/2013 | Das |
| 2014/0137573 A1 | 5/2014 | Lin |

(Continued)

FOREIGN PATENT DOCUMENTS

| | | |
|---|---|---|
| CN | 103836861 A | 6/2014 |
| CN | 105667250 B | 4/2018 |
| CN | 106196764 B | 5/2019 |

(Continued)

*Primary Examiner* — Kun Kai Ma
(74) *Attorney, Agent, or Firm* — Dority & Manning, P.A.

(57) ABSTRACT

An air conditioner unit includes a refrigeration loop including a condenser and an evaporator, a compressor for circulating refrigerant, and an electronic expansion valve. A controller monitors an operating superheat of the refrigerant across the evaporator, identifies a superheat fault condition based on at least one of the operating superheat, a target valve position of the electronic expansion valve, or a compressor speed, stops the compressor in response to identifying the superheat fault condition, and initiates a calibration process of the electronic expansion valve.

20 Claims, 8 Drawing Sheets

(56) References Cited

U.S. PATENT DOCUMENTS

2019/0056155 A1\* 2/2019 Ishiyama ............... F25B 13/00
2020/0158370 A1 5/2020 Lu

FOREIGN PATENT DOCUMENTS

| | | | |
|---|---|---|---|
| CN | 106322640 B | | 5/2019 |
| CN | 111076367 B | | 11/2020 |
| JP | H01222164 A | | 9/1989 |
| JP | 2000088363 A | \* | 3/2000 |
| KR | 101372144 B1 | | 3/2014 |
| KR | 20190101675 A | | 9/2019 |
| WO | WO-2017085886 A1 | \* | 5/2017 ............... F25B 1/00 |
| WO | WO2020166273 A1 | | 8/2020 |

\* cited by examiner

METHOD OF OPERATING AN ELECTRONIC EXPANSION VALVE IN AN AIR CONDITIONER UNIT

FIELD OF THE INVENTION

The present disclosure relates generally to air conditioner units, and more particularly to methods of operating electronic expansion valves in air conditioner units.

BACKGROUND OF THE INVENTION

Air conditioner or conditioning units are conventionally utilized to adjust the temperature indoors, e.g., within structures such as dwellings and office buildings. Such units commonly include a closed refrigeration loop to heat or cool the indoor air. Typically, the indoor air is recirculated while being heated or cooled. A variety of sizes and configurations are available for such air conditioner units. For example, some units may have one portion installed within the indoors that is connected to another portion located outdoors, e.g., by tubing or conduit carrying refrigerant. These types of units are typically used for conditioning the air in larger spaces.

Another type of air conditioner unit, commonly referred to as single-package vertical units (SPVU) or package terminal air conditioners (PTAC), may be utilized to adjust the temperature in, for example, a single room or group of rooms of a structure. These units typically operate like split heat pump systems, except that the indoor and outdoor portions are defined by a bulkhead and all system components are housed within a single package that installed in a wall sleeve positioned within an opening of an exterior wall of a building.

When a conventional PTAC is operating in a cooling or heating mode, a compressor circulates refrigerant within a sealed system, while indoor and outdoor fans urge flows of air across indoor and outdoor heat exchangers respectively. For example, when running these air conditioner units to either heat or cool a room at various ambient conditions or compressor speeds, an expansion device (such as an electronic expansion valve or "EEV") is used to expand refrigerant and permit a phase change from liquid to vapor within the evaporator prior to passing the refrigerant back into the compressor.

In order to determine the absolute position of the EEV, a homing or calibration process may be performed by driving the EEV to a fully closed position so that the software position (e.g., the position that the controller thinks the EEV is in) is equal to the absolute position (e.g., the actual physical position of the EEV). However, after this calibration is performed, the EEV may lose steps over time so that the software position is not equal to the absolute position. Eventually, so many steps may be lost that the controller thinks the EEV is fully closed when it is not. In this case, the controller will not be able to create superheat, sending liquid into the compressor and potentially damaging it.

Accordingly, improved air conditioner units and methods of operation would be useful. More specifically, a heat pump air conditioner unit that regulates an electronic expansion valve for improved operating safety and system performance would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, an air conditioner unit is provided including a refrigeration loop comprising a condenser and an evaporator, a compressor operably coupled to the refrigeration loop and being configured to urge refrigerant through the refrigeration loop, an electronic expansion valve fluidly coupled to the refrigeration loop, and a controller operably coupled to the compressor and the electronic expansion valve. The controller is configured to monitor an operating superheat of the refrigerant across the evaporator, identify a superheat fault condition based on at least one of the operating superheat, a target valve position of the electronic expansion valve, or a compressor speed, stop the compressor in response to identifying the superheat fault condition, and initiate a calibration process of the electronic expansion valve.

In another exemplary embodiment, a method of operating an air conditioner unit is provided. The air conditioner unit includes a refrigeration loop comprising a condenser and an evaporator, a compressor operably coupled to the refrigeration loop and being configured to urge refrigerant through the refrigeration loop, and an electronic expansion valve fluidly coupled to the refrigeration loop. The method includes monitoring an operating superheat of the refrigerant across the evaporator, identifying a superheat fault condition based on at least one of the operating superheat, a target valve position of the electronic expansion valve, or a compressor speed, stopping the compressor in response to identifying the superheat fault condition, and initiating a calibration process of the electronic expansion valve.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
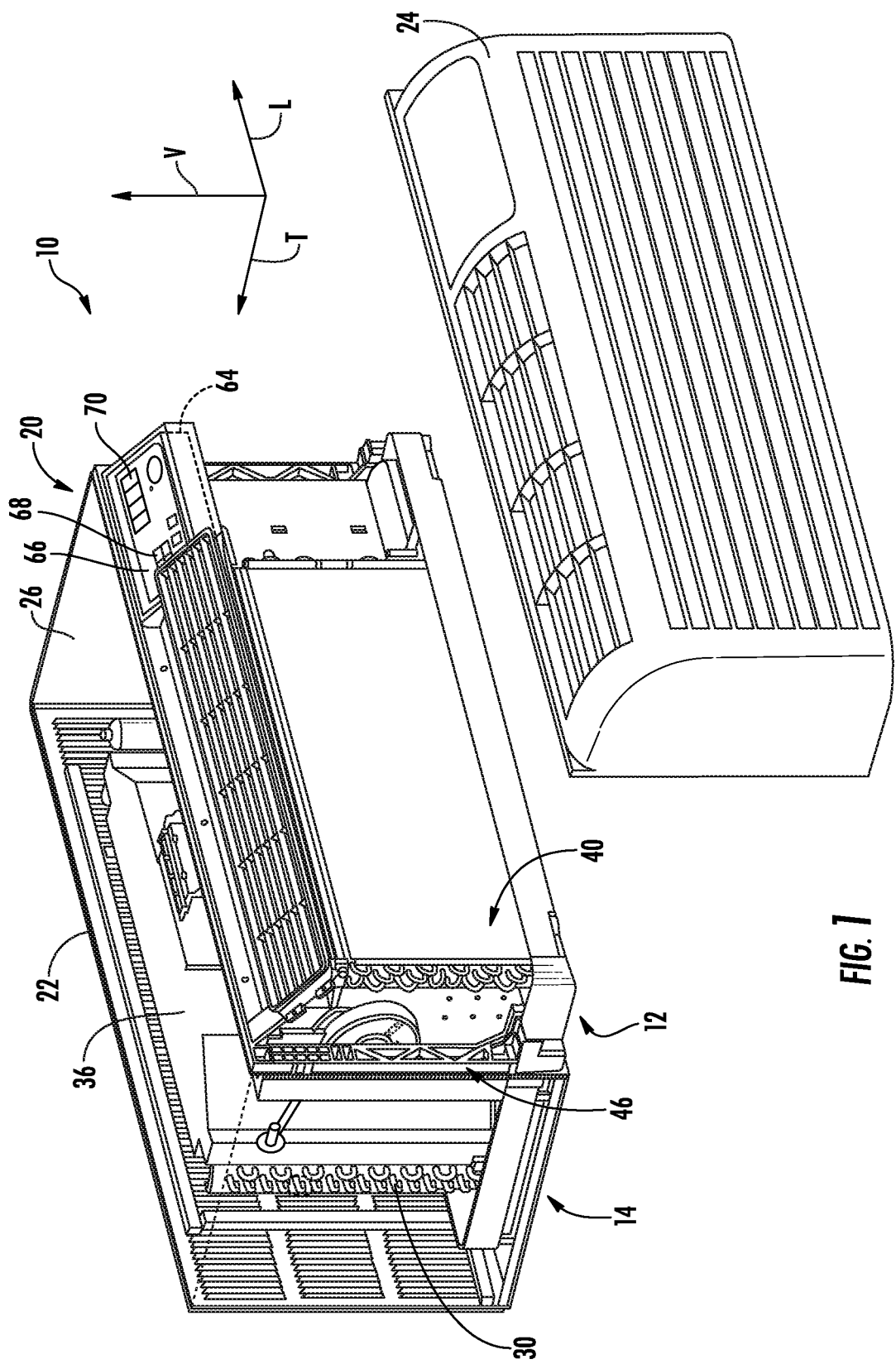
FIG. 1 provides a perspective view of an air conditioner unit, with part of an indoor portion exploded from a remainder of the air conditioner unit for illustrative purposes, in accordance with one exemplary embodiment of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
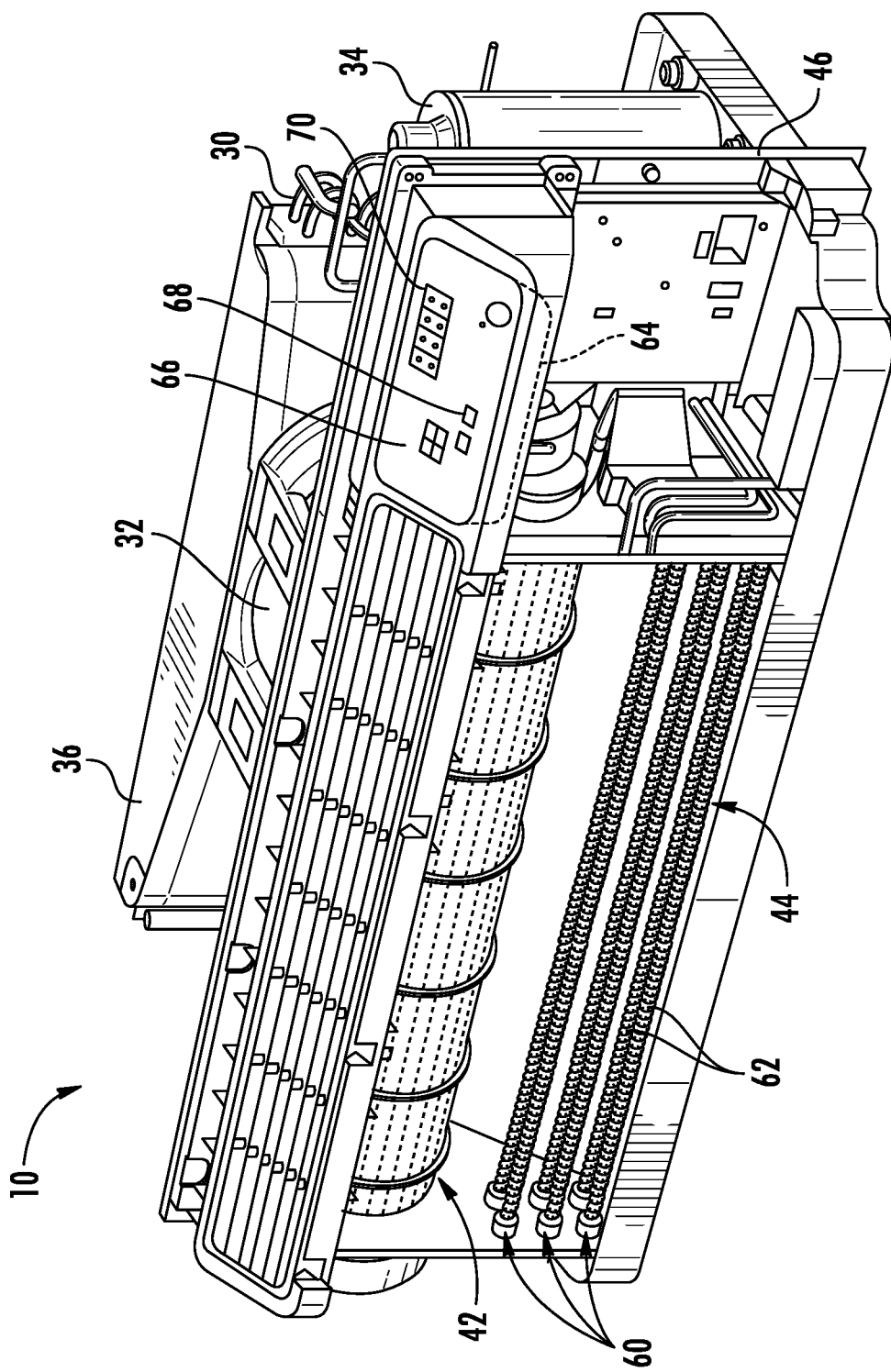
FIG. 2 is another perspective view of components of the indoor portion of the exemplary air conditioner unit of FIG. 1.

Referring now to FIGS. 1 and 2, an air conditioner unit 10 is provided. The air conditioner unit 10 is a one-unit type air conditioner, also conventionally referred to as a room air conditioner or a packaged terminal air conditioner (PTAC). The unit 10 includes an indoor portion 12 and an outdoor portion 14, and generally defines a vertical direction V, a lateral direction L, and a transverse direction T. Each direction V, L, T is perpendicular to each other, such that an orthogonal coordinate system is generally defined. Although aspects of the present subject matter are described with reference to PTAC unit 10, it should be appreciated that aspects of the present subject matter may be equally applicable to other air conditioner unit types and configurations, such as single package vertical units (SPVUs) and split heat pump systems.

A housing 20 of the unit 10 may contain various other components of the unit 10. Housing 20 may include, for example, a rear grill 22 and a room front 24 which may be spaced apart along the transverse direction T by a wall sleeve 26. The rear grill 22 may be part of the outdoor portion 14, and the room front 24 may be part of the indoor portion 12. Components of the outdoor portion 14, such as an outdoor heat exchanger 30, an outdoor fan 32, and a compressor 34 may be housed within the wall sleeve 26. A fan shroud 36 may additionally enclose outdoor fan 32, as shown.

Indoor portion 12 may include, for example, an indoor heat exchanger 40, a blower fan or indoor fan 42, and a heating unit 44. These components may, for example, be housed behind the room front 24. Additionally, a bulkhead 46 may generally support and/or house various other components or portions thereof of the indoor portion 12, such as indoor fan 42 and the heating unit 44. Bulkhead 46 may generally separate and define the indoor portion 12 and outdoor portion 14.

Figure 3:
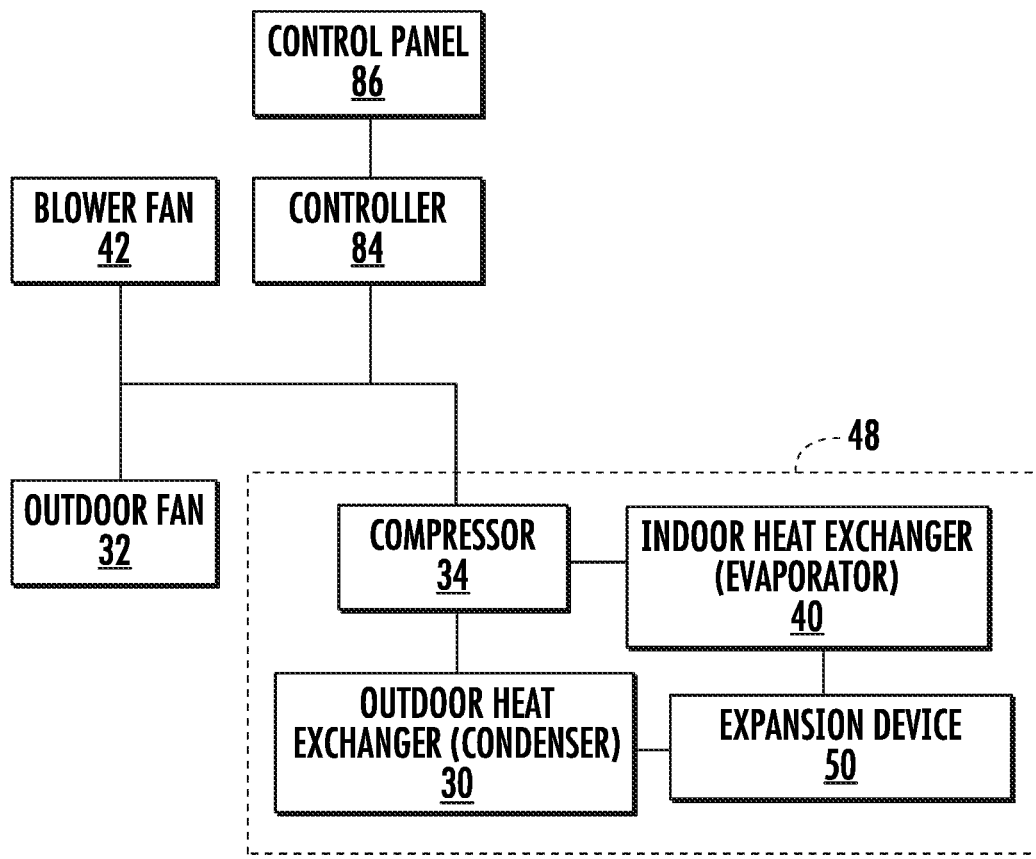
FIG. 3 is a schematic view of a refrigeration loop in accordance with one embodiment of the present disclosure.

Outdoor and indoor heat exchangers 30, 40 may be components of a sealed system or refrigeration loop 48, which is shown schematically in FIG. 3. Refrigeration loop 48 may, for example, further include compressor 34 and an expansion device 50. As illustrated, compressor 34 and expansion device 50 may be in fluid communication with outdoor heat exchanger 30 and indoor heat exchanger 40 to flow refrigerant therethrough as is generally understood. More particularly, refrigeration loop 48 may include various lines for flowing refrigerant between the various components of refrigeration loop 48, thus providing the fluid communication there between. Refrigerant may thus flow through such lines from indoor heat exchanger 40 to compressor 34, from compressor 34 to outdoor heat exchanger 30, from outdoor heat exchanger 30 to expansion device 50, and from expansion device 50 to indoor heat exchanger 40. The refrigerant may generally undergo phase changes associated with a refrigeration cycle as it flows to and through these various components, as is generally understood. Suitable refrigerants for use in refrigeration loop 48 may include pentafluoroethane, difluoromethane, or a mixture such as R410a, although it should be understood that the present disclosure is not limited to such examples and rather that any suitable refrigerant may be utilized.

As is understood in the art, refrigeration loop 48 may be alternately operated as a refrigeration assembly (and thus perform a refrigeration cycle) or a heat pump (and thus perform a heat pump cycle). As shown in FIG. 3, when refrigeration loop 48 is operating in a cooling mode and thus performing a refrigeration cycle, the indoor heat exchanger 40 acts as an evaporator and the outdoor heat exchanger 30 acts as a condenser. Alternatively, when the assembly is operating in a heating mode and thus performs a heat pump cycle, the indoor heat exchanger 40 acts as a condenser and the outdoor heat exchanger 30 acts as an evaporator. The outdoor and indoor heat exchangers 30, 40 may each include coils through which a refrigerant may flow for heat exchange purposes, as is generally understood.

According to an example embodiment, compressor 34 may be a variable speed compressor. In this regard, compressor 34 may be operated at various speeds depending on the current air conditioning needs of the room and the demand from refrigeration loop 48. For example, according to an exemplary embodiment, compressor 34 may be configured to operate at any speed between a minimum speed, e.g., 1500 revolutions per minute (RPM), to a maximum rated speed, e.g., 3500 RPM. Notably, use of variable speed compressor 34 enables efficient operation of refrigeration loop 48 (and thus air conditioner unit 10), minimizes unnecessary noise when compressor 34 does not need to operate at full speed, and ensures a comfortable environment within the room.

Specifically, according to an exemplary embodiment, compressor 34 may be an inverter compressor. In this regard, compressor 34 may include a power inverter, power electronic devices, rectifiers, or other control electronics suitable for converting an alternating current (AC) power input into a direct current (DC) power supply for the compressor. The inverter electronics may regulate the DC power output to any suitable DC voltage that corresponds to a specific operating speed of compressor. In this manner compressor 34 may be regulated to any suitable operating speed, e.g., from 0% to 100% of the full rated power and/or speed of the compressor. This may facilitate precise compressor operation at the desired operating power and speed, thus meeting system needs while maximizing efficiency and minimizing unnecessary system cycling, energy usage, and noise.

In exemplary embodiments as illustrated, expansion device 50 may be disposed in the outdoor portion 14 between the indoor heat exchanger 40 and the outdoor heat exchanger 30. According to the exemplary embodiment, expansion device 50 may be an electronic expansion valve ("EEV") that enables controlled expansion of refrigerant, as is known in the art. According to alternative embodiments, expansion device 50 may be a capillary tube or another suitable expansion device configured for use in a thermodynamic cycle.

More specifically, according to exemplary embodiments, electronic expansion device 50 may be configured to precisely control the expansion of refrigerant to maintain, for example, a desired temperature differential of the refrigerant across the evaporator (i.e., the outdoor heat exchanger 30 in heat pump mode). In other words, electronic expansion device 50 throttles the flow of refrigerant based on the reaction of the temperature differential across the evaporator or the amount of superheat temperature differential, thereby ensuring that the refrigerant is in the gaseous state entering compressor 34.

In general, the terms "superheat," "operating superheat," or the like are generally intended to refer to the temperature increase of the refrigerant past the fully saturated vapor temperature in the evaporator. In this regard, for example, the superheat may be quantified in degrees Fahrenheit, e.g., such that 1° F. superheat means that the refrigerant exiting the evaporator is 1° F. higher than the saturated vapor temperature. It should be appreciated that the operating superheat may be measured and monitored by controller 64 in any suitable manner. For example, controller may be operably coupled to a pressure sensor for measuring the refrigerant pressure exiting the evaporator, may convert that pressure to the saturated vapor temperature, and may subtract that temperature from the measured refrigerant temperature at the evaporator outlet to determine superheat.

According to exemplary embodiments, expansion device or electronic expansion valve 50 may be driven by a stepper motor or other drive mechanism to any desirable position between a fully closed position (e.g., when no refrigerant passes through EEV 50) to a fully open position (e.g., when there is little or no restriction through the EEV 50). For example, controller 64 may be operably coupled to EEV 50 and may regulate the position of the EEV 50 through a control signal to achieve a target superheat, a target restriction/expansion, etc.

More specifically, the control signal communicated from controller 64 may specify the number of control steps (or simply "steps") and a corresponding direction (e.g., counterclockwise toward the closed position or clockwise toward the open position). Each EEV 50 may have a physical stroke span equal to the difference between the fully open position and the fully closed position. In addition, the EEV 50 may include a step range or range of control steps that correspond to the number adjustment steps it take for the EEV 50 to travel from the fully closed position to the fully open position.

Each "step" may refer to a predetermined rotation of the drive mechanism, e.g., such as a stepper motor, which may in turn move the EEV 50 a fixed linear distance toward the open or closed position (depending on the commanded step direction). For example, according to the exemplary embodiment, the EEV 50 may have a step range of 500 steps, with 0 steps corresponding to fully closed and 500 steps corresponding to fully open. However, it should be appreciated that according to alternative embodiments, any given electronic expansion valve may include a different number of control steps, and the absolute step adjustments describe herein may be varied accordingly.

In addition, as used herein, the position of EEV 50 may be expressed as a percentage, e.g., where 0% corresponds to a fully closed position and 100% corresponds to a fully open position. According to exemplary embodiments, this percentage representation may also refer to the percentage of total control steps taken from the closed position, e.g., with 10% referring to 50 steps (e.g., 10% of the 500 total steps) and 80% referring to 400 steps (e.g., 80% of 500 total steps).

According to the illustrated exemplary embodiment, outdoor fan 32 is an axial fan and indoor fan 42 is a centrifugal fan. However, it should be appreciated that according to alternative embodiments, outdoor fan 32 and indoor fan 42 may be any suitable fan type. In addition, according to an exemplary embodiment, outdoor fan 32 and indoor fan 42 are variable speed fans, e.g., similar to variable speed compressor 34. For example, outdoor fan 32 and indoor fan 42 may rotate at different rotational speeds, thereby generating different air flow rates. It may be desirable to operate fans 32, 42 at less than their maximum rated speed to ensure safe and proper operation of refrigeration loop 48 at less than its maximum rated speed, e.g., to reduce noise when full speed operation is not needed. In addition, according to alternative embodiments, fans 32, 42 may be operated to urge make-up air into the room.

According to the illustrated embodiment, indoor fan 42 may operate as an evaporator fan in refrigeration loop 48 to encourage the flow of air through indoor heat exchanger 40. Accordingly, indoor fan 42 may be positioned downstream of indoor heat exchanger 40 along the flow direction of indoor air and downstream of heating unit 44. Alternatively, indoor fan 42 may be positioned upstream of indoor heat exchanger 40 along the flow direction of indoor air and may operate to push air through indoor heat exchanger 40.

Heating unit 44 in exemplary embodiments includes one or more heater banks 60. Each heater bank 60 may be operated as desired to produce heat. In some embodiments as shown, three heater banks 60 may be utilized. Alternatively, however, any suitable number of heater banks 60 may be utilized. Each heater bank 60 may further include at least one heater coil or coil pass 62, such as in exemplary embodiments two heater coils or coil passes 62. Alternatively, other suitable heating elements may be utilized.

The operation of air conditioner unit 10 including compressor 34 (and thus refrigeration loop 48 generally) indoor fan 42, outdoor fan 32, heating unit 44, expansion device 50, and other components of refrigeration loop 48 may be controlled by a processing device such as a controller 64. Controller 64 may be in communication (via for example a suitable wired or wireless connection) to such components of the air conditioner unit 10. Controller 64 may include a memory and one or more processing devices such as microprocessors, CPUs or the like, such as general or special purpose microprocessors operable to execute programming instructions or micro-control code associated with operation of unit 10. The memory may represent random access memory such as DRAM, or read only memory such as ROM or FLASH. In one embodiment, the processor executes programming instructions stored in memory. The memory may be a separate component from the processor or may be included onboard within the processor.

Unit 10 may additionally include a control panel 66 and one or more user inputs 68, which may be included in control panel 66. The user inputs 68 may be in communication with the controller 64. A user of the unit 10 may interact with the user inputs 68 to operate the unit 10, and user commands may be transmitted between the user inputs 68 and controller 64 to facilitate operation of the unit 10 based on such user commands. A display 70 may additionally be provided in the control panel 66 and may be in communication with the controller 64. Display 70 may, for example be a touchscreen or other text-readable display screen, or alternatively may simply be a light that can be activated and deactivated as required to provide an indication of, for example, an event or setting for the unit 10.

Figure 4:
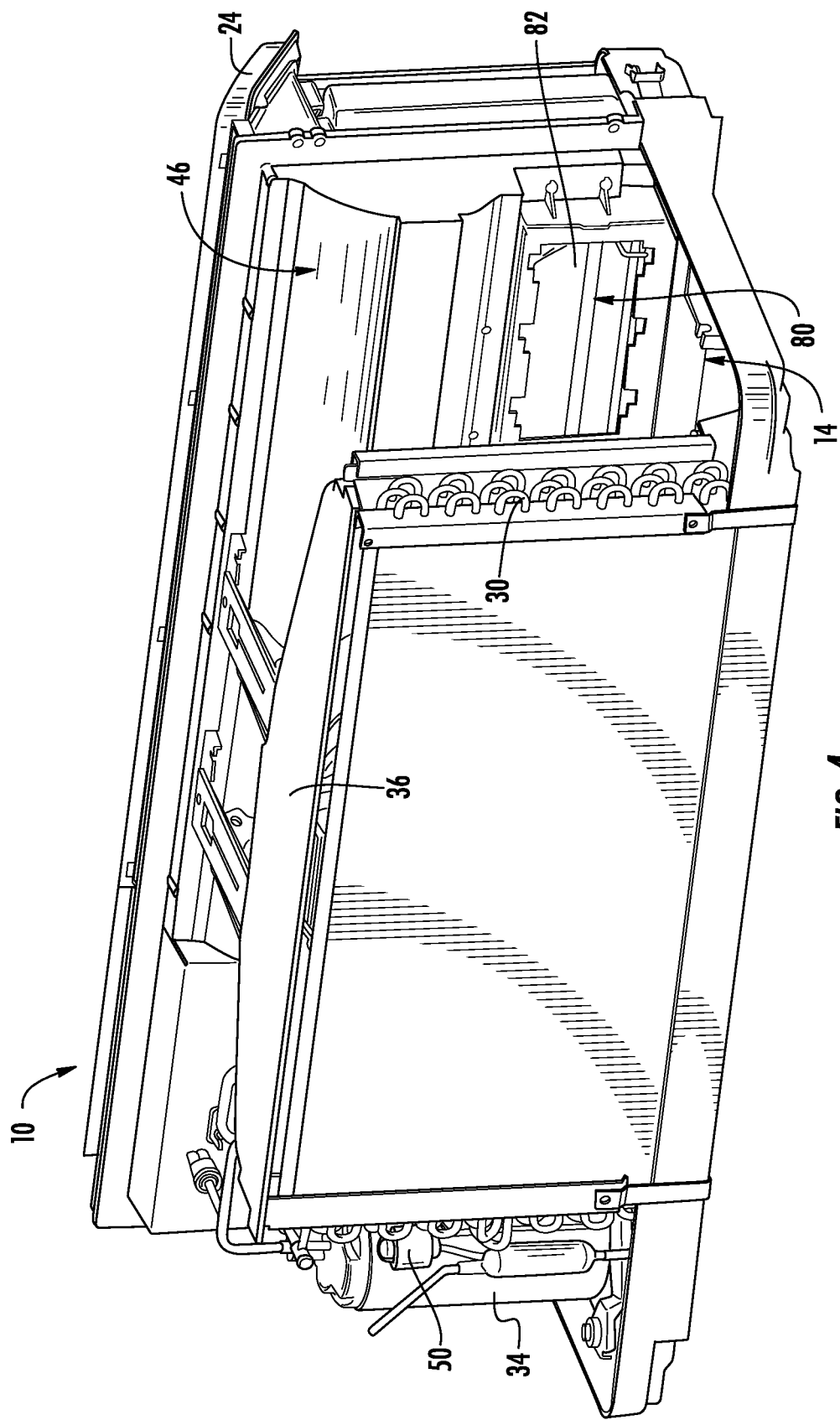
FIG. 4 is a rear perspective view of an outdoor portion of the exemplary air conditioner unit of FIG. 1, illustrating a vent aperture in a bulkhead in accordance with one embodiment of the present disclosure.

Referring briefly to FIG. 4, a vent aperture 80 may be defined in bulkhead 46 for providing fluid communication between indoor portion 12 and outdoor portion 14. Vent aperture 80 may be utilized in an installed air conditioner unit 10 to allow outdoor air to flow into the room through the indoor portion 12. In this regard, in some cases it may be desirable to allow outside air (i.e., "make-up air") to flow into the room in order, e.g., to meet government regulations, to compensate for negative pressure created within the room, etc. In this manner, according to an exemplary embodiment, make-up air may be provided into the room through vent aperture 80 when desired.

Figure 5:
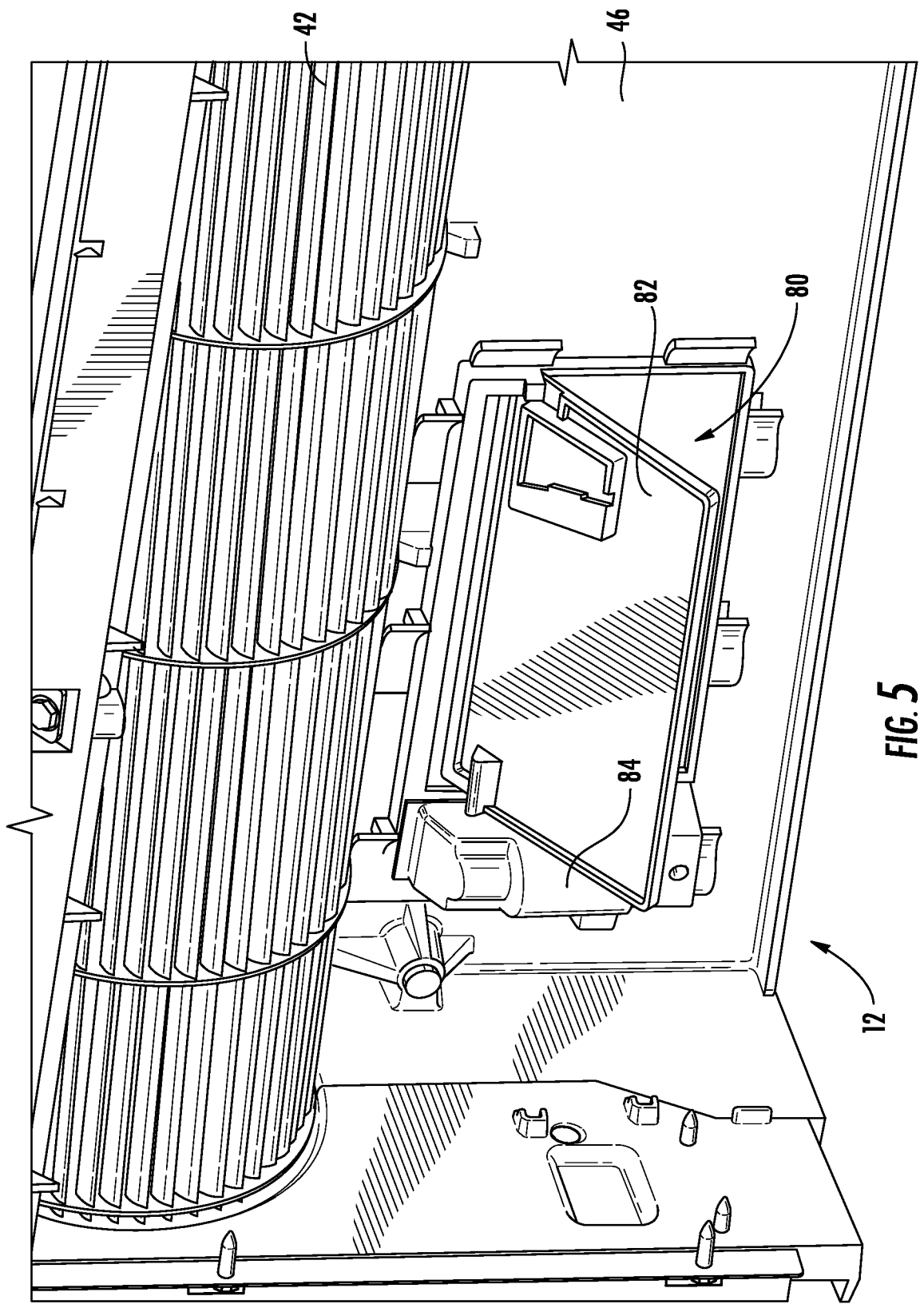
FIG. 5 is a front perspective view of the exemplary bulkhead of FIG. 4 with a vent door illustrated in the open position in accordance with one embodiment of the present disclosure.

As shown in FIG. 5, a vent door 82 may be pivotally mounted to the bulkhead 46 proximate to vent aperture 80 to open and close vent aperture 80. More specifically, as illustrated, vent door 82 is pivotally mounted to the indoor facing surface of indoor portion 12. Vent door 82 may be configured to pivot between a first, closed position where vent door 82 prevents air from flowing between outdoor portion 14 and indoor portion 12, and a second, open position where vent door 82 is in an open position (as shown in FIG. 5) and allows make-up air to flow into the room. According to the illustrated embodiment vent door 82 may be pivoted between the open and closed position by an electric motor 84 controlled by controller 64, or by any other suitable method.

In some cases, it may be desirable to treat or condition make-up air flowing through vent aperture 80 prior to blowing it into the room. For example, outdoor air which has a relatively high humidity level may require treating before passing into the room. In addition, if the outdoor air is cool, it may be desirable to heat the air before blowing it into the room. Therefore, according to an exemplary embodiment of the present subject matter, unit 10 may further include an auxiliary sealed system that is positioned over vent aperture 80 for conditioning make-up air. The auxiliary sealed system may be a miniature sealed system that acts similar to refrigeration loop 48, but conditions only the air flowing through vent aperture 80. According to alternative embodiments, such as that described herein, make-up air may be urged through vent aperture 80 without the assistance of an auxiliary sealed system. Instead, make-up air is urged through vent aperture 80 may be conditioned at least in part by refrigeration loop 48, e.g., by passing through indoor heat exchanger 40. Additionally, the make-up air may be conditioned immediately upon entrance through vent aperture 80 or sequentially after combining with the air stream induced through indoor heat exchanger 40.

Figure 6:
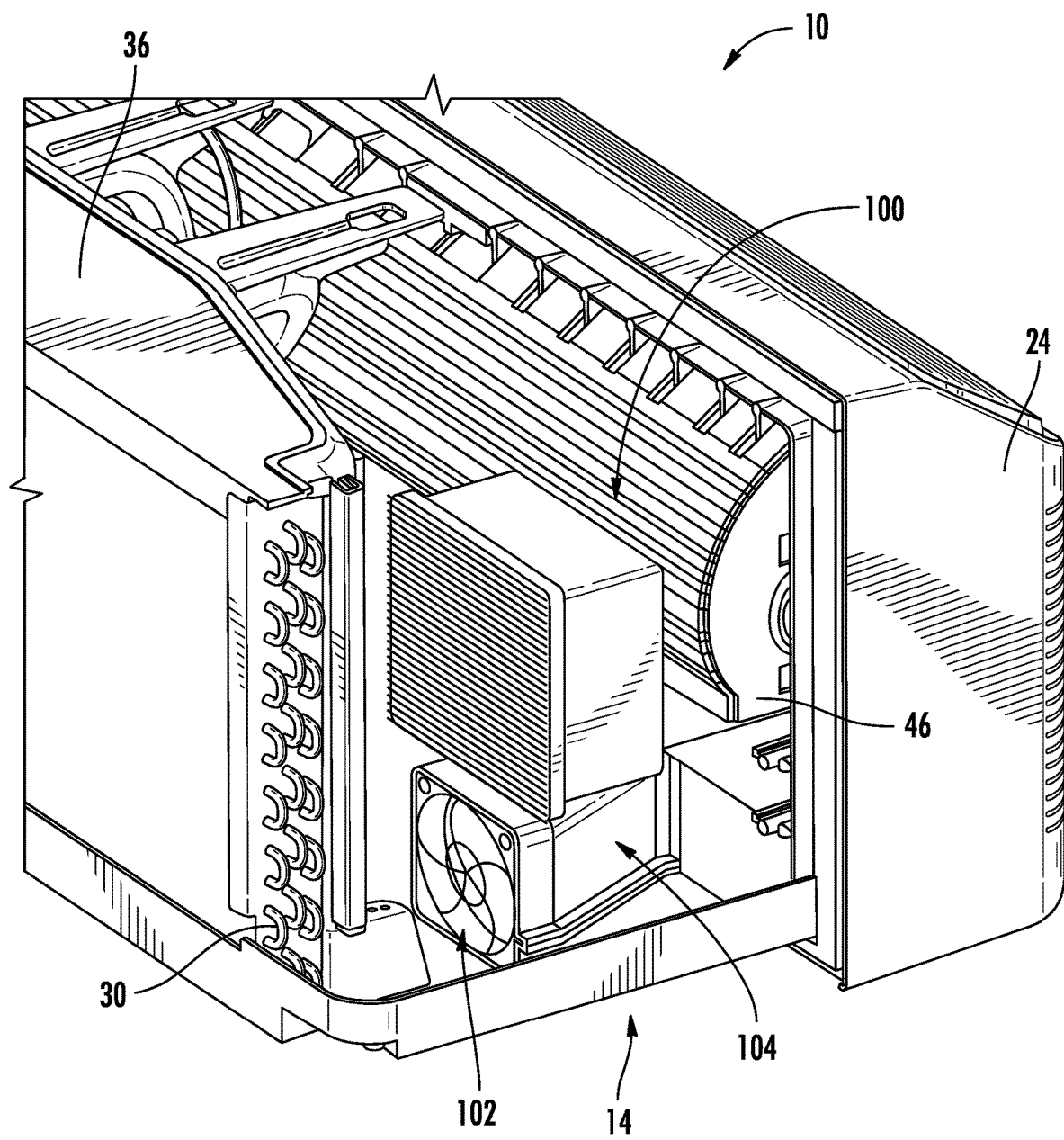
FIG. 6 is a rear perspective view of the exemplary air conditioner unit and bulkhead of FIG. 4 including a fan assembly for providing make-up air in accordance with one embodiment of the present disclosure.

Referring now to FIG. 6, a fan assembly 100 will be described according to an exemplary embodiment of the present subject matter. According to the illustrated embodiment, fan assembly 100 is generally configured for urging the flow of makeup air through vent aperture 80 and into a conditioned room without the assistance of an auxiliary sealed system. However, it should be appreciated that fan assembly 100 could be used in conjunction with a make-up air module including an auxiliary sealed system for conditioning the flow of make-up air. As illustrated, fan assembly 100 includes an auxiliary fan 102 for urging a flow of make-up air through a fan duct 104 and into indoor portion 12 through vent aperture 80.

According to the illustrated embodiment, auxiliary fan 102 is an axial fan positioned at an inlet of fan duct 104, e.g., upstream from vent aperture 80. However, it should be appreciated that any other suitable number, type, and configuration of fan or blower could be used to urge a flow of makeup air according to alternative embodiments. In addition, auxiliary fan 102 may be positioned in any other suitable location within air conditioner unit 10 and auxiliary fan 102 may be positioned at any other suitable location within or in fluid communication with fan duct 104. The embodiments described herein are only exemplary and are not intended to limit the scope present subject matter.

Figure 7:
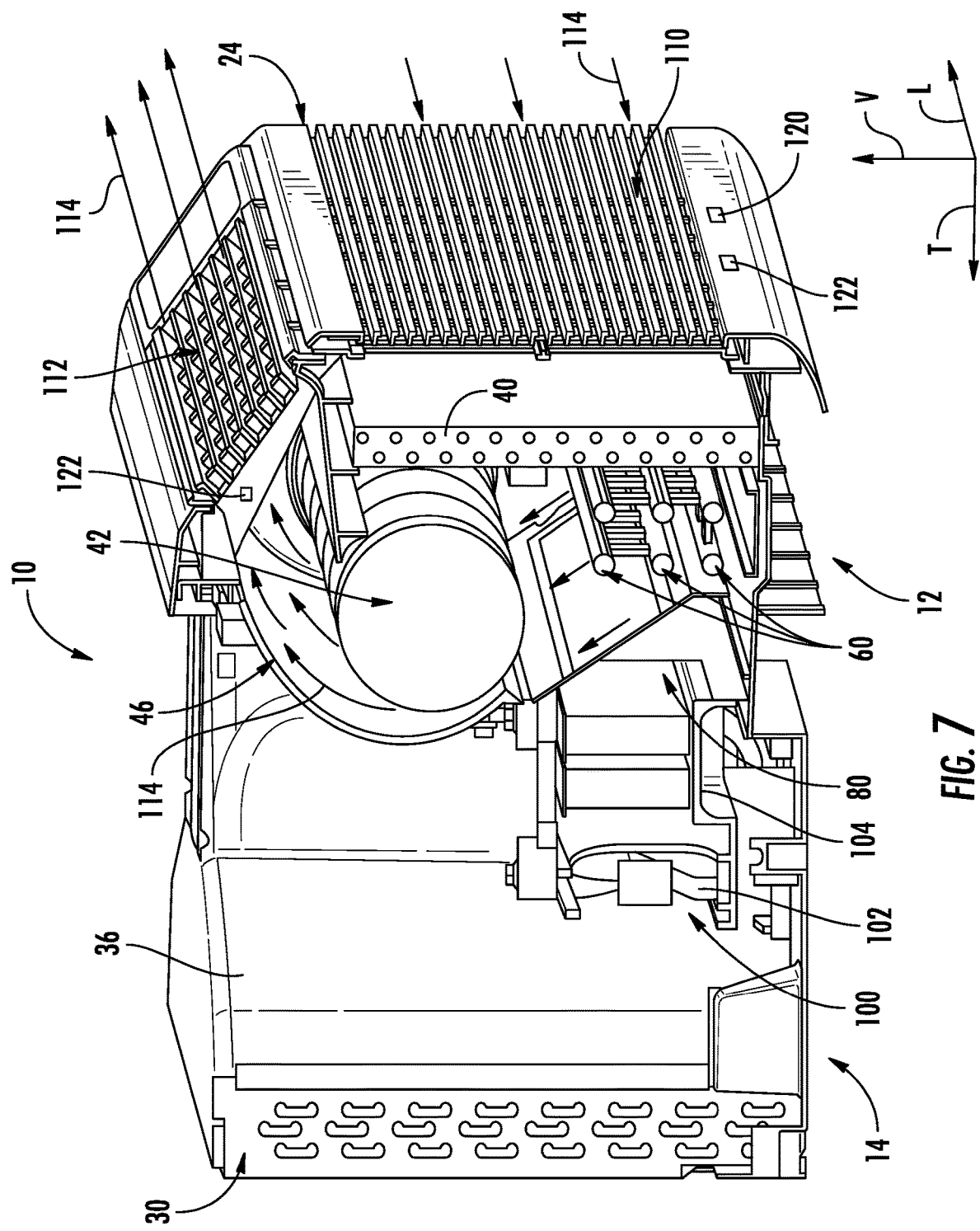
FIG. 7 is a side cross sectional view of the exemplary air conditioner unit of FIG. 1.

Referring now to FIG. 7, operation of unit 10 will be described according to an exemplary embodiment. More specifically, the operation of components within indoor portion 12 will be described during a cooling operation or cooling cycle of unit 10. To simplify discussion, the operation of auxiliary fan 102 for providing make-up air through vent aperture 80 will be omitted, e.g., as if vent door 82 were closed. Although a cooling cycle will be described, it should be further appreciated that indoor heat exchanger 40 and/or heating unit 44 be used to heat indoor air according to alternative embodiments. Moreover, although operation of unit 10 is described below for the exemplary packaged terminal air conditioner unit, it should be further appreciated that aspects the present subject matter may be used in any other suitable air conditioner unit, such as a heat pump or split unit system.

As illustrated, room front 24 of unit 10 generally defines an intake vent 110 and a discharge vent 112 for use in circulating a flow of air (indicated by arrows 114) throughout a room. In this regard, indoor fan 42 is generally configured for drawing in air 114 through intake vent 110 and urging the flow of air through indoor heat exchanger 40 before discharging the air 114 out of discharge vent 112. According to the illustrated embodiment, intake vent 110 is positioned proximate a bottom of unit 10 and discharge vent 112 is positioned proximate a top of unit 10. However, it should be appreciated that according to alternative embodiments, intake vent 110 and discharge vent 112 may have any other suitable size, shape, position, or configuration.

During a cooling cycle, refrigeration loop 48 is generally configured for urging cold refrigerant through indoor heat exchanger 40 in order to lower the temperature of the flow of air 114 before discharging it back into the room. Specifically, during a cooling operation, controller 64 may be provided with a target temperature, e.g., as set by a user for the desired room temperature. In general, components of refrigeration loop 48, outdoor fan 32, indoor fan 42, and other components of unit 10 operate to continuously cool the flow of air.

In order to facilitate operation of refrigeration loop 48 and other components of unit 10, unit 10 may include a variety of sensors for detecting conditions internal and external to the unit 10. These conditions can be fed to controller 64 which may make decisions regarding operation of unit 10 to rectify undesirable conditions or to otherwise condition the flow of air 114 into the room. For example, as best illustrated in FIG. 7, unit 10 may include an indoor temperature sensor 120 which is positioned and configured for measuring the indoor temperature within the room. In addition, unit 10 may include an indoor humidity sensor 122 which is positioned and configured for measuring the indoor humidity within the room. In this manner, unit 10 may be used to regulate the flow of air 114 into the room until the measured indoor temperature reaches the desired target temperature and/or humidity level.

As used herein, "temperature sensor" or the equivalent is intended to refer to any suitable type of temperature measuring system or device positioned at any suitable location for measuring the desired temperature. Thus, for example, temperature sensor 120 may each be any suitable type of temperature sensor, such as a thermistor, a thermocouple, a resistance temperature detector, a semiconductor-based integrated circuit temperature sensor, etc. In addition, temperature sensor 120 may be positioned at any suitable location and may output a signal, such as a voltage, to a controller that is proportional to and/or indicative of the temperature being measured. Although exemplary positioning of temperature sensors is described herein, it should be appreciated that unit 10 may include any other suitable number, type, and position of temperature, and/or other sensors according to alternative embodiments.

As used herein, the terms "humidity sensor" or the equivalent may be intended to refer to any suitable type of humidity measuring system or device positioned at any suitable location for measuring the desired humidity. Thus, for example, humidity sensor 122 may refer to any suitable type of humidity sensor, such as capacitive digital sensors, resistive sensors, and thermal conductivity humidity sensors. In addition, humidity sensor 122 may be positioned at any suitable location and may output a signal, such as a voltage, to a controller that is proportional to and/or indicative of the humidity being measured. Although exemplary positioning of humidity sensors is described herein, it should be appreciated that unit 10 may include any other suitable number, type, and position of humidity sensors according to alternative embodiments.

Now that the construction of air conditioner unit 10 and the configuration of controller 64 according to exemplary embodiments have been presented, an exemplary method 200 of operating a packaged terminal air conditioner unit will be described. Although the discussion below refers to the exemplary method 200 of operating air conditioner unit 10, one skilled in the art will appreciate that the exemplary method 200 is applicable to the operation of a variety of other air conditioning appliances. In exemplary embodiments, the various method steps as disclosed herein may be performed by controller 64 or a separate, dedicated controller.

Figure 8:
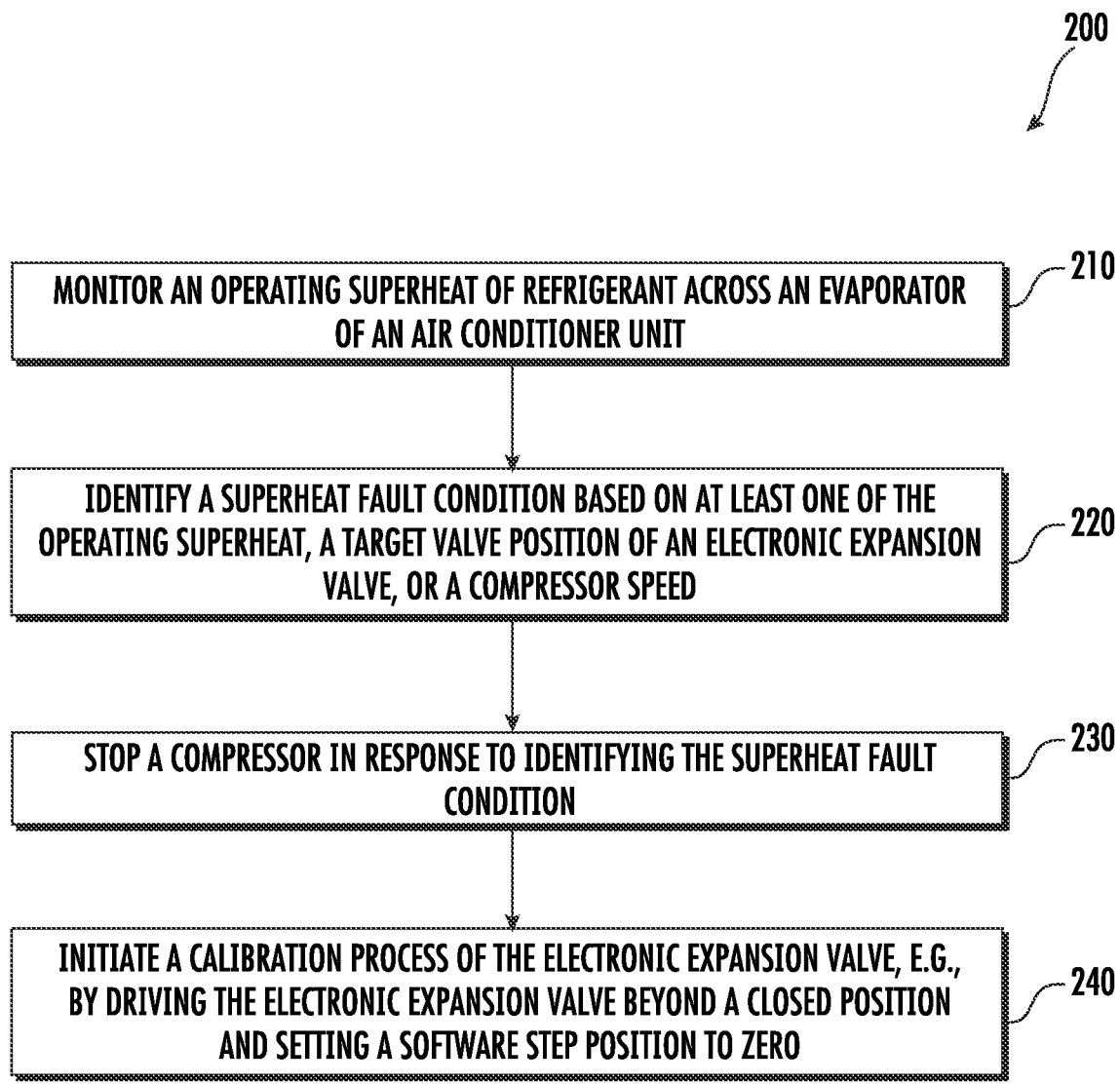
FIG. 8 illustrates a method for operating an air conditioner unit in accordance with one embodiment of the present disclosure.

Referring now to FIG. 8, method 200 includes, at step 210, monitoring an operating superheat of refrigerant across an evaporator of an air conditioner unit. In this regard, continuing example from above, controller 64 may continuously or periodically determine the superheat within refrigeration loop 48. More specifically, for example, when air conditioner unit 10 is operating in a heat pump mode, such that outdoor heat exchanger 30 acts as the evaporator, air conditioner unit 10 may monitor the superheat within outdoor heat exchanger 30. As explained above, the superheat may be determined or measured in any suitable manner. For example, as is understood in the art, the operating superheat may be obtained by subtracting the saturated vapor temperature (e.g., as determined by a measured evaporator pressure) from the measured refrigerant temperature exiting the evaporator. Other suitable methods for determining superheat are possible and within the scope of the present subject matter.

Step 220 generally includes identifying a superheat fault condition based on at least one of the operating superheat (e.g., as measured at step 210), a target valve position of an electronic expansion valve, or a compressor speed. In this regard, when these parameters fall within predetermined ranges or outside target ranges, this may be indicative of a superheat fault, such as an issue with the expansion device 50 (e.g., the EEV). Failure to adjust the operation of air conditioner unit 10 to correct the superheat fault condition may result in inefficiencies of air conditioner unit 10 or damage to the air conditioner unit 10. For example, if the superheat fault condition is associated with a superheat that is too low, the refrigerant may pass into compressor 34 as a liquid, resulting in damage. By contrast, if the superheat fault condition is associated with a superheat that is too high, then the heat extraction and efficiency of the system may be low.

Exemplary ways of identifying a superheat fault condition will be described below. However, it should be appreciated that other methods of identifying superheat fault conditions may be used while remaining within the scope of the present subject matter. For example, one manner of identifying a superheat fault condition may be related to an undesirably low superheat condition. In this regard, identifying the superheat fault condition may include determining that the operating superheat (e.g., measured at step 210) is less than a predetermined lower preheat threshold and that the target valve position is less than a lower valve position for a predetermined time period, and also that the compressor speed exceeds a compressor speed threshold. According to exemplary embodiments, if all of these conditions are satisfied, then a superheat fault condition should be triggered.

It should be appreciated that the predetermined lower preheat threshold, the lower valve position, the predetermined time period, and the compressor speed threshold may be determined in any manner and may vary depending on the unit design, ambient conditions, target room conditions, etc. For example, the predetermined lower preheat threshold may be between about 0° F. and 4° F., between about 0.5° F. and 2° F., or about 1° F. According to exemplary embodiments, the target valve position may be the desired position of EEV 50 as determined by controller 64, e.g., to maintain desired superheat across the evaporator.

In addition, the lower valve position may be any quantitative data representative of the position of EEV 50. For example, the lower valve position may be represented as a percent that the EEV 50 has been opened. In this regard, 0% may refer to the valve being fully closed, while 100% may refer to the valve being fully open. This lower valve position may also refer to a linear position of the valve along its stroke length or as an area of the valve opening relative to a maximum area when in the fully open position. According to exemplary embodiments, the lower valve position may be between about 2% and a 20% open, between about 6% and 15% open, or about 10% open.

In addition, the lower valve position may be quantified by referring to the number of steps that the valve has been moved within the valve step range. In this regard, as explained above, EEV 50 may be moved approximately 500 steps between the fully closed and fully open position. Accordingly, a lower number of steps may generally refer to less rotation of a stepper motor within EEV 50, smaller translation of the valve plunger, and a more closed EEV 50. According to exemplary embodiments, the lower valve position may be between about 10 and 150 steps, between about 25 and 100 steps, between about 40 and 60 steps, or about 50 steps.

According to exemplary embodiments, the compressor speed threshold may be between about 1000 and 3000 revolutions per minute, between about 1500 and 2500 revolutions per minute, or about 2000 revolutions per minute. As noted above, when these conditions exist, this may be indicative of a low superheat fault condition. However, in order to avoid constant triggers during transient operation of air conditioner unit 10, the predetermined time period may be used to ensure that the conditions persist for a long enough time to indicate that an issue actually exists. For example, according to exemplary embodiments, the predetermined time period may be between about 30 seconds and 10 minutes, between about 1 and 5 minutes, between about 2 and 4 minutes, or about 3 minutes.

According to another exemplary embodiment, another manner of identifying a superheat fault condition may be related to an undesirably high superheat condition. In this regard, identifying the superheat fault condition may include determining that the operating superheat (e.g., as determined at step 210) is greater than a predetermined upper preheat threshold and that the target valve position is greater than an upper valve position for a predetermined time period. In general, the predetermined upper preheat threshold and the upper valve position may be similar to the thresholds described above but are applicable to the high superheat condition. In this regard, for example, the predetermined upper preheat threshold may be between about 5° F. and 15° F., between about 7° F. and 13° F., or about 10° F. In addition, the upper valve position may be between about 50% and 95% open, between about 70% and 90% open, or about 80% open. Additionally, or alternatively, the upper valve position may be between about 300 and 450 steps, between about 350 and 425 steps, between about 375 and 410 steps, or about 400 steps. The predetermined time period may be the same or similar to that described above related to low superheat condition.

According to still other embodiments, another manner of identifying a superheat fault condition may be related to identifying a large discrepancy between a target valve position and then empirically determined linear position. For example, the target valve position, as described above, relates to the position of EEV 50 that controller deems necessary to maintain the desired superheat across the evaporator. In general, the empirically determined linear position of the EEV 50 refers to the expected position of EEV 50 based on the compressor speed, ambient temperature conditions, and empirically determined constants. For example, the empirically determined linear position may be determined using the following equation:

$$EEV\ Position = A \cdot \omega_{Comp} + B \cdot (T_{Outdoor} - T_{indoor}) + C$$

where: EEV Position is the empirically determined linear position;
A, B, and C are empirically determined constants;
$\omega_{comp}$ is the compressor speed;
$T_{outdoor}$ is the outdoor ambient temperature; and
$T_{indoor}$ is the indoor ambient temperature.

Under normal operating circumstances, the target valve position and the empirically determined linear position should be relatively similar. Thus, if a magnitude of the difference between these two values is greater than an offset threshold for a predetermined amount of time, this may be indicative of a superheat fault condition. It should be appreciated that the offset threshold may be based on a difference in the absolute position of the valve, a difference in the number of steps between the target valve position and the empirically determined linear position, or as a percentage difference relative to the total step range.

For example, the offset threshold may be between about 5% and 40%, between about 10% and 30%, or about 20% of a step range of the electronic expansion valve. Thus, for example, if the target valve position is 300 steps and the empirically determined linear position is 150 steps, then the difference is 150 steps, which is 30% of the total step range. If this 30% offset is maintained for a predetermined amount of time (e.g., a time period similar to that described above), and the offset threshold is 20%, this may trigger a superheat fault condition.

When a superheat fault condition is identified at step 220, step 230 may include stopping the compressor in response to identifying the superheat fault condition. In this manner, potentially damaging operation of air conditioner unit 10 may be avoided. In addition, step 240 may include initiating a calibration process or a homing process of the electronic expansion valve. In this manner, the superheat fault condition may be indicative of the fact that the controller software position of the electronic expansion valve does not correspond to the actual position of the electronic expansion valve. This calibration process performed at step 240 may be intended to sync up with the software position and the actual position.

For example, this calibration process may include operating the controller 64 to move the EEV 50 to the fully closed software position and then continuing to close the EEV 50. In this manner, by driving the electronic expansion valve beyond what the software thinks is the closed position, controller 64 may presume that the electronic expansion of valve is in fact fully closed. The controller 64 may then set the step position to zero such that the software position and the actual position are homed in on zero/closed. In other words, the software position may be set to zero when the physical position is known to be zero (i.e., or fully closed). According to exemplary embodiments, a time delay (e.g., 2 minutes) may be implemented after stopping the compressor and before performing the calibration/homing process, e.g., to permit pressures within the refrigeration loop to equalize. According to still other embodiments, an additional time delay may be implemented after calibration before the restart of an operating cycle is permitted.

Notably, if the calibration process is successful and there are no other hardware faults within air conditioner unit 10, subsequent operating cycles of air conditioner unit 10 should result in no triggering of the superheat fault conditions. However, repeated and consistent triggering of the superheat fault conditions may be indicative of system errors other than poor calibration of the electronic expansion valve. Accordingly, controller 64 may be programmed to analyze faults to determine whether they are repeated at an undesirable rate. For example, controller may implement a fault counter when a superheat fault condition is identified but may clear the fault counter upon completion of a successful operating cycle. If the fault counter exceeds the predetermined count threshold (e.g., such as 5 counts), controller 64 may permanently lockout air conditioner unit 10, e.g., until maintenance is performed or other corrective action is taken.

According to alternative embodiments, a fault counter may be used that tracks the number of EEV faults and starts at a predetermined maximum value, such as 5 counts. Every time a cycle completes successfully without an EEV fault in proportional-integral ("PI") control, or when 24 hours passes, the counter is increased by 1 (unless it is at the maximum value). If an EEV superheat fault occurs, the counter may be decreased by 1. If the counter reaches 0, the EEV PI control is locked out and the empirically determined linear control is used until the counter increases (i.e., 24 hours pass and the fault counter increments by 1).

FIG. 8 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 are explained using unit 10 as an example, it should be appreciated that this method may be applied to operate any suitable air conditioner unit.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An air conditioner unit comprising:
   a refrigeration loop comprising a condenser and an evaporator;
   a compressor operably coupled to the refrigeration loop and being configured to urge refrigerant through the refrigeration loop;
   an electronic expansion valve fluidly coupled to the refrigeration loop; and
   a controller operably coupled to the compressor and the electronic expansion valve, the controller being configured to:
   monitor an operating superheat of the refrigerant across the evaporator;
   identify a superheat fault condition based on at least one of the operating superheat, a target valve position of the electronic expansion valve, or a compressor speed, wherein identifying the superheat fault condition comprises determining that the operating superheat is less than a predetermined lower preheat threshold and that the target valve position is less than a lower valve position for a predetermined time period;
   stop the compressor in response to identifying the superheat fault condition; and
   initiate a calibration process of the electronic expansion valve.

2. The air conditioner unit of claim 1, wherein identifying the superheat fault condition further comprises:
   determining that the compressor speed exceeds a compressor speed threshold.

3. The air conditioner unit of claim 1, wherein the predetermined lower preheat threshold is about 1 degree Fahrenheit.

4. The air conditioner unit of claim 1, wherein the lower valve position is about a 10% open position.

5. The air conditioner unit of claim 1, wherein the lower valve position is 50 steps when a step range of the electronic expansion valve extends from 0 steps in a fully closed position and 500 steps in a fully open position.

6. The air conditioner unit of claim 1, wherein the compressor speed threshold is between about 1500 and 2500 revolutions per minute.

7. The air conditioner unit of claim 1, wherein the predetermined time period is between about 2 and 4 minutes.

8. The air conditioner unit of claim 1, wherein identifying the superheat fault condition comprises:
   determining that the operating superheat is greater than a predetermined upper preheat threshold and that the target valve position is greater than an upper valve position for a predetermined time period.

9. The air conditioner unit of claim 8, wherein the predetermined upper preheat threshold is about 10 degrees Fahrenheit.

10. The air conditioner unit of claim 8, wherein the upper valve position is about an 80% open position.

11. The air conditioner unit of claim 8, wherein the upper valve position is 400 steps when a step range of the electronic expansion valve extends from 0 steps in a fully closed position and 500 steps in a fully open position.

12. The air conditioner unit of claim 8, wherein the predetermined time period is between about 2 and 4 minutes.

13. The air conditioner unit of claim 1, wherein identifying the superheat fault condition comprises:
   determining that a magnitude of a difference between the target valve position and an empirically determined linear position of the electronic expansion valve is greater than an offset threshold for a predetermined period of time.

14. The air conditioner unit of claim 13, wherein the offset threshold is about 20% of a step range of the electronic expansion valve and the predetermined period of time is between about 2 and 4 minutes.

15. The air conditioner unit of claim 1, wherein initiating the calibration process of the electronic expansion valve comprises:
   driving the electronic expansion valve beyond a closed position; and
   setting a step position to zero.

16. The air conditioner unit of claim 1, wherein the controller is further configured to:
   increment a fault counter when the superheat fault condition is identified;
   clearing the fault counter upon completion of a successful operating cycle; and
   locking the air conditioner unit or initiating an empirically determined linear control mode if the fault counter exceeds a count threshold.

17. A method of operating an air conditioner unit, the air conditioner unit comprising a refrigeration loop comprising a condenser and an evaporator, a compressor operably coupled to the refrigeration loop and being configured to urge refrigerant through the refrigeration loop, and an electronic expansion valve fluidly coupled to the refrigeration loop, the method comprising:
   monitoring an operating superheat of the refrigerant across the evaporator;
   identifying a superheat fault condition based on at least one of the operating superheat, a target valve position of the electronic expansion valve, or a compressor speed, wherein identifying the superheat fault condition comprises determining that the operating superheat is greater than a predetermined upper preheat threshold and that the target valve position is greater than an upper valve position for a predetermined time period;
   stopping the compressor in response to identifying the superheat fault condition; and
   initiating a calibration process of the electronic expansion valve.

18. The method of claim 17, wherein identifying the superheat fault condition comprises:
   determining that the operating superheat is less than a predetermined lower preheat threshold and that the target valve position is less than a lower valve position for a predetermined time period; and
   determining that the compressor speed exceeds a compressor speed threshold.

19. An air conditioner unit comprising:
a refrigeration loop comprising a condenser and an evaporator;
a compressor operably coupled to the refrigeration loop and being configured to urge refrigerant through the refrigeration loop;
an electronic expansion valve fluidly coupled to the refrigeration loop; and
a controller operably coupled to the compressor and the electronic expansion valve, the controller being configured to:
monitor an operating superheat of the refrigerant across the evaporator;
identify a superheat fault condition based on at least one of the operating superheat, a target valve position of the electronic expansion valve, or a compressor speed, wherein identifying the superheat fault condition comprises determining that a magnitude of a difference between the target valve position and an empirically determined linear position of the electronic expansion valve is greater than an offset threshold for a predetermined period of time;
stop the compressor in response to identifying the superheat fault condition; and
initiate a calibration process of the electronic expansion valve.

20. The air conditioner unit of claim 19, wherein the offset threshold is about 20% of a step range of the electronic expansion valve and the predetermined period of time is between about 2 and 4 minutes.

* * * * *